United States Patent [19]

Tiegs et al.

[11] Patent Number: 4,676,513
[45] Date of Patent: Jun. 30, 1987

[54] ONE-PIECE SPLIT BOOT FOR UNIVERSAL JOINT

[76] Inventors: Del V. Tiegs, 15878 E. Wind Cir., Sunrise, Fla. 33326; Randy G. Tiegs, 20631 NW. Miami Ct., Miami, Fla. 33169

[21] Appl. No.: 840,514

[22] Filed: Mar. 17, 1986

[51] Int. Cl.⁴ .............................................. F16J 15/52
[52] U.S. Cl. ............................ 277/212 FB; 277/199; 277/215; 74/18; 403/51
[58] Field of Search ............. 277/212 R, 212 FB, 203, 277/204, 215, 199; 74/18, 18.1, 18.2; 403/50, 51

[56] References Cited

U.S. PATENT DOCUMENTS

| 2,226,388 | 12/1940 | Richter | 74/18.1 X |
|---|---|---|---|
| 2,768,036 | 10/1956 | Greenough | 277/199 |
| 3,638,503 | 2/1972 | Stipanovic et al. | 74/18 |
| 3,660,213 | 5/1972 | Moseley | 74/18 X |
| 3,717,351 | 2/1973 | Liebig | 277/199 X |
| 4,211,423 | 7/1980 | Resech | 277/12 X |
| 4,396,656 | 8/1983 | Still et al. | 285/381 X |
| 4,558,869 | 12/1985 | Grove et al. | 277/212 FB X |

FOREIGN PATENT DOCUMENTS

| 1775265 | 8/1971 | Fed. Rep. of Germany | 277/212 FB |
|---|---|---|---|
| 684106 | 3/1930 | France | 277/215 |
| 1155819 | 5/1985 | U.S.S.R. | 277/212 FB |

Primary Examiner—Robert S. Ward
Attorney, Agent, or Firm—Malin, Haley & McHale

[57] ABSTRACT

A split boot formed from a unitary, flexible body shaped to be helically wrapped around a universal joint or the like. Once the flexible body is wrapped around the joint with the mating edges engaged a main body is formed having a generally hollow truncated conical configuration with a corrugated or helical shape. One end of the main body has a smaller circular cross section than the other end. Each end portion of the main body has cutting guide ridges such that the diameter of the aperture in the end may be varied by removing some of the material from the body.

11 Claims, 9 Drawing Figures

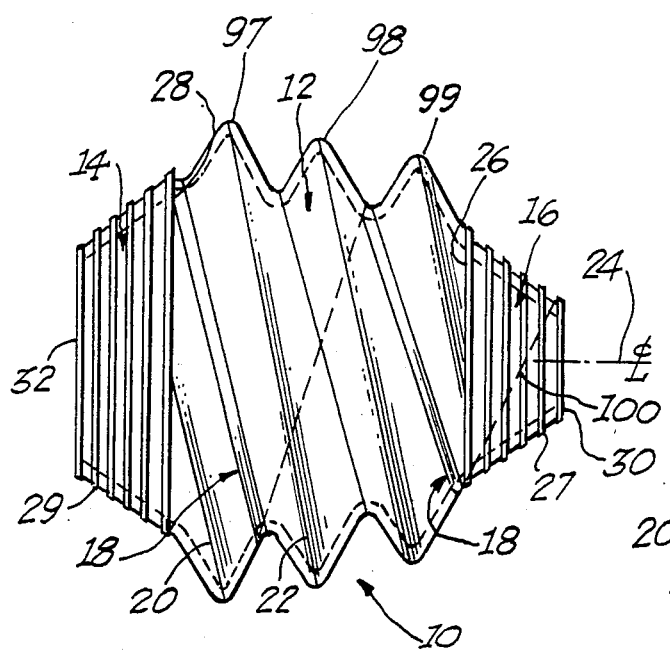
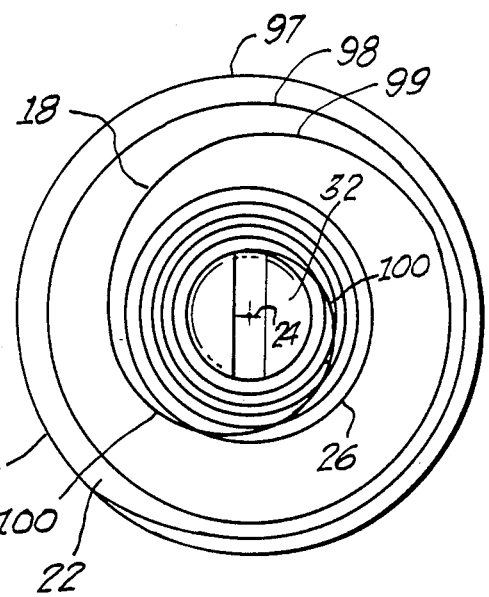
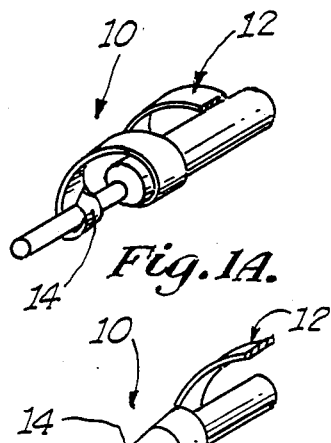
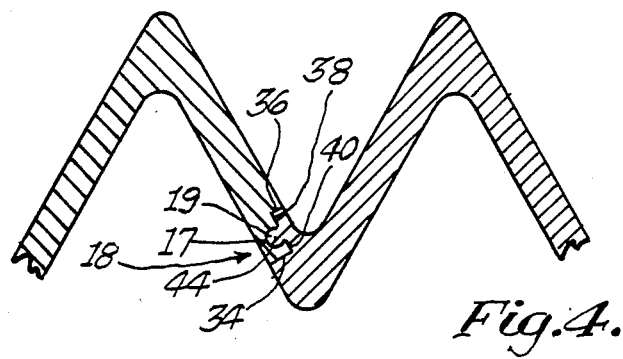
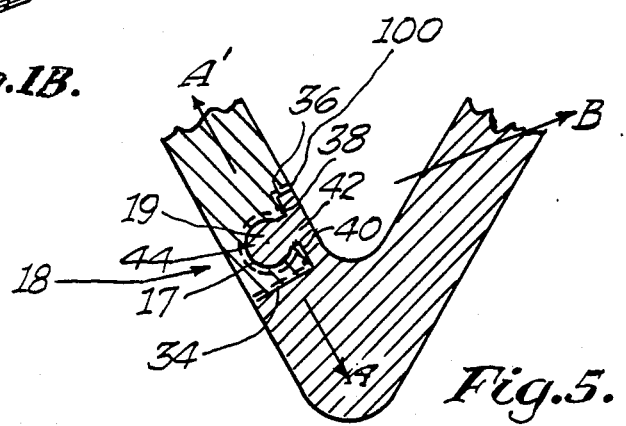

ONE-PIECE SPLIT BOOT FOR UNIVERSAL JOINT

BACKGROUND OF THE INVENTION

The present invention relates to boots for covering universal joints and the like and more particularly to unitary, flexible body having a first mating edge and second mating edge and shaped to be helically wrapped about a universal joint, coupling or other type of structure without disassembling the structure in which the first mating edge is engaged with the second mating edge thereby forming a removable boot for the universal joint or the like.

In the past, a structure such as a C.V. joint on front wheel drive vehicles had to be disassembled to replace a damaged boot. Such procedures prove to be both costly and time consuming. Furthermore, boots having cracks, tears or loose clamps or other types of damage may lose lubricant, or allow water or dirt to enter the boot, causing eventual deteriation of the joint. Other procedures have been attempted to replace damaged boots. For example, a boot may be cut down the side and placed over the C.V. joint and glued back together. However, this procedure is difficult to perform because the cut area must be clean and the reglued area must be further supported using extra clamps. The work area is usually greasy and almost impossible to keep clean. Any grease on the cut area of the boot will prevent it from being properly sealed. Any cracks left in the seal will allow dirt and water to enter and the lubricant to leak out.

The boot of the present invention does not require a clean area, and in fact the boot will be sufficiently sealed even if some grease accumulates in the sealing area. Furthermore, the present invention does not require additional clamps to attach it to the joint or the like and by providing truncated conical end portions with cut away portions thereon the invention allows for alterations of the boot to fit structures of varying size. In addition, the present invention may be removed and replaced without disassembling the mechanical unit it covers.

SUMMARY OF THE INVENTION

The present invention provides a split boot formed from a unitary, flexible body shaped to be helically wrapped around a universal joint or the like. Once the flexible body is wrapped around the joint with the mating edges engaged a main body is formed having a generally hollow truncated conical configuration with a corrugated or helical shape. In the preferred embodiment one end of the main body has a smaller circular cross section than the other end. Each end portion of the main body has cutting guide ridges such that the diameter of the aperture in the end may be varied by removing some of the material from the body, to accomodate different sized joints or mechanical units. The corrugations or the helical shape in the main body are diagonally disposed relative to the longitudinal axis of the main body to provide longitudinal flexibility and for providing the recirculation of lubricating oils during rotational movement of the boot with a rotating mechanical unit and to equalize rotational forces on the boot to prevent premature rupture and cracking thereof.

It is an object of the present invention to provide a novel split boot that is easily used and sealingly connects or mates around a universal joint or the like without disassembly of the joint.

It is another object of the present invention to provide a novel split boot having helical overlapping snap sealing means for making it easy to install and remove the boot from a universal joint or the like.

It is a further object of the present invention to provide a novel split boot having a corrugated shape with the corrugations being generally diagonally disposed relative to the longitudinal axis of the boot which facilitates recirculation of the lubricating oil contained therein.

It is an additional object of the present invention to provide a split boot having a sealing means positioned so that the sealing means is not subject to premature cracking, rupturing and opening thereof.

In accordance with these and other objects which will be apparent hereinafter, the instant invention will now be described with particular reference to the accompanying drawings.

BRIEF DESCRIPTION OF THE DRAWINGS

In the drawings

FIG. 1A is a plan view of the split boot of the present invention disassembled;

FIG. 1B is a plan view of the split boot partially assembled;

FIG. 2 is a side view of the split boot of present invention in final sealed and assembled form;

FIG. 3 is a right end view of the split boot of the present invention in final sealed form;

FIG. 4 is a partial cross sectional view of the main body 10 of FIG. 1;

FIG. 5 is an enlarged view of the sealing means of FIG. 4;

DESCRIPTION OF THE PREFERRED EMBODIMENT

Figure 6:
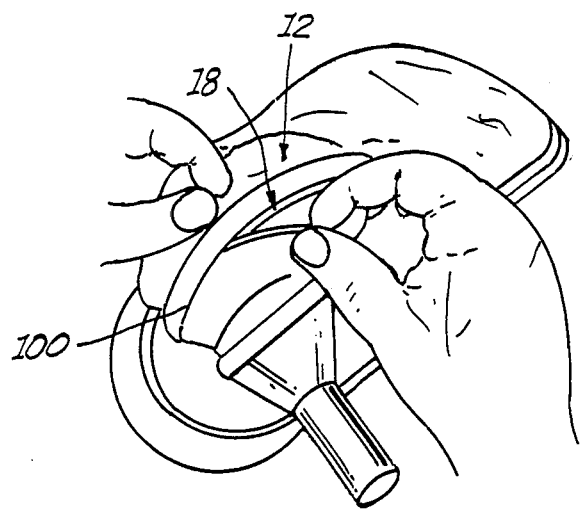
FIG. 6 is an illustration of connecting the connecting means on the main body.
Figure 7:
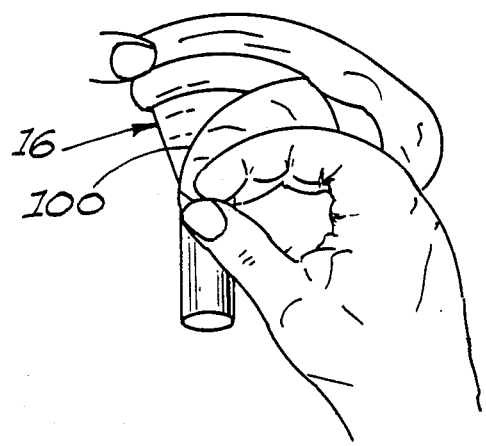
FIG. 7 is an illustration of connecting the connecting means on the end portion.
Figure 8:
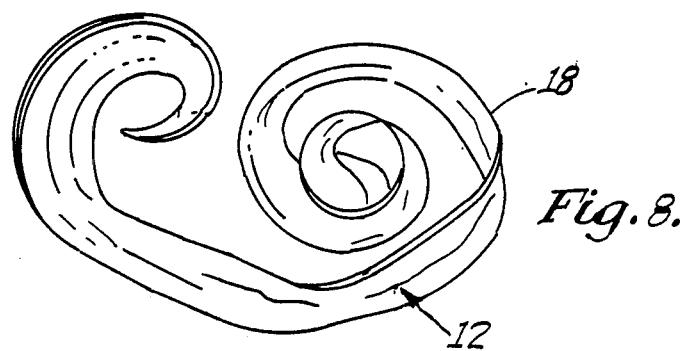
FIG. 8 is an illustration of the split boot in an unconnected configuration.

Referring now to FIGS. 1A, 1B and 2, the split boot 10 covers a mechanical unit such as joint or rotating C.V. joint. The split boot 10 includes a unitary main body portion 12, two end portions 14 and 16, a grooved mating edge 17 and a male mating edge 19 in FIG. 4. The grooved mating edge 17 may be engaged by the male mating edge 19 to form a connecting means 18 in FIGS. 2 and 3. The connecting means is positioned so that centrifugal force from rotation about the center line 24 does not pull male member 19 directly out of female member 17. The boot 10 may be constructed entirely out of Ethylene-Neoprene rubber such as that sold under the trademark VAMAC by DuPont. When the interlocking sealing means 18 is disengaged the entire boot 10 may be laid down in a flat configuration as shown in FIG. 1. This allows the boot to be installed about a structure such as a universal joint, coupling or other type of structure without disassembling the structure.

Referring now to FIG. 2, the body 10 has a main body portion 12 of a generally hollow truncated conical corrugated configuration or helical when assembled. As can be seen the plane of each protruding corrugated portion 20 and 22 is diagonally disposed relative to the longitudinal axis 24 of the main body 10. (i.e. The plane of each protrusion is not normal to the axis). The corrugated configuration provides for recirculation of the lubricating oil when rotational movement of the universal joint or the like occurs. The oil moves in the screw-like threads. The corrugated configuration also provides for equalization of forces caused by rotational movement of the boot thus preventing premature cracking or rupturing of the boot. In FIG. 3 the size of the corrugated portions are illustrated by numerals 97, 98 and 99.

The main body 12 has a smaller circular top 26 and a larger circular base 28. The two truncated conical end portions 14 and 16 emanating from the circular bases 28 and 26 respectively have circular top openings. The end portions include sizing guides 27, 29 that allow accurate trimming of the boot 10 to specific sizes, such that the one boot will accomodate the needs for most vehicles.

Referring now to FIGS. 4 and 5, the first grooved mating opening or edge 17 and the complementary male mating bulb or edge 19 is shown in the removably engaged position and may be referred to as a connecting means. When the grooved mating edge 17 is not engaged by the male mating edge 19, the edge portions of the main body 10 are separated from each other allowing the main body 10 to be wrapped around a structure without disassembling it. Numeral 100 shows the separation line in FIGS. 2 through 5. The grooved mating edge 17 includes an end portion 34 and a flat portion 38, while the male mating edge 19 includes the end portion 36 and the flat portion 40 all which together form the removable connecting means 17, 19. The male mating edge 19 includes a flange 42 and a bulbus end 44 that fits in the grooved mating edge 17 of a complementary shape. The configuration of the connecting means 17, 19 resists opening forces in the directions shown by the arrows AA', while the material around the bulbous end 42 provides for resistance to opening in the direction of arrow B. The connecting means 17, 19 also provides for periodic non-destructive removal of the boot 10 in FIG. 2 for inspection of the structure thereunder and regreasing if necessary, and resealing of the boot. The split boot may be made out of rubber or neoprene type material.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A one piece universal joint boot comprising:
a relatively large hollow body sized in length and width and shaped for encompassing a plurality of universal joints of varying sizes;
said hollow body having a longitudinal body center line;
said hollow body including means for varying the effective length of said hollow body to fit over a plurality of universal joints of varying size;
said hollow body having relatively small conical connecting means at each end of said hollow body;
each said connecting means including opening for universal joint shafts;
said conical connecting means including universal joint shaft diameter ring shaped sizing guides means connected on said connecting means, said sizing guide means for facilitating accurate trimming a portion of said conical connecting means of said boot to accomodate different universal joint shafts.

2. A one piece universal joint boot as set forth in claim 1, wherein:
said means of said hollow body including a corrugated or accordian configuration.

3. A one piece universal joint boot as set forth in claim 2, wherein:
said hollow body is in the form of a three dimensional spiral of at least three hundred and sixty degrees.

4. A one piece universal joint boot as set forth in claim 2, wherein:
said hollow body having an outer edge of a relatively larger diameter in a spiral configuration and a lower edge of a relatively smaller diameter in a spiral configuration to form a conical shaped corrugated or accordian configuration.

5. A one piece universal joint boot as set forth in claim 4, wherein:
said conical shaped corrugated or accordian configuration providing a lubricant moving means for lubricating said universal joint in said universal joint boot.

6. A one piece universal joint boot as set forth in claim 1, wherein:
said joint boot is split longitudinally generally along a spiral line.

7. A one piece universal joint boot as set forth in claim 3, wherein:
said joint boot is split longitudinally generally along a spiral line.

8. A one piece universal joint boot as set forth in claim 5, wherein:
said joint boot is split longitudinally generally along a spiral line.

9. A one piece universal joint boot comprising:
a relatively large hollow body sized in length and width and shaped for encompassing a plurality of universal joints of varying sizes;
said hollow body including a spirally positioned releasable line connector means for connecting said hollow body into a boot and for disconnecting said hollow body to provide a flat configuration, said connector means alllowing said boot to be connected over a universal joint without first disconnecting said universal joint;
said hollow body generally conical in shape when said connecting means are connected together;
said hollow body having a longitudinal body center line;
said hollow body including means for varying the effective length of said hollow body to fit over a plurality of universal joints of varying size;
said hollow body having relatively small conical connecting means at each end of said hollow body;
each said connecting means including opening for universal joint shafts;
said conical connecting means including universal joint shaft diameter ring shaped sizing guides means connected on said connecting means, said sizing guide means for facilitating accurate trimming a portion of said conical connecting means of said boot to accomodate different universal joint shafts;
said connecting means including:
a first mating portion integral one edge of said hollow body;

a second mating portion integral the other edge of said hollow body;

said second mating portion non-destructively, removably engageable with said second mating portion whereby said boot is formed.

10. A one piece universal joint as set forth in claim 9, wherein:

said first mating portion includes a substantially longitudinal slot with a substantially circular-shaped groove therein;

said second mating portion includes a bulbous protruding portion sized and shaped for engagement with said substantially circular-shaped groove.

11. A one piece universal joint as set forth in claim 10, wherein:

said second mating portion engages said first mating portion in a direction normal to the plane of each protruding portion of said corrugated portion whereby separation of said connecting means is prevented during rotation of said boot.

* * * * *

UNITED STATES PATENT AND TRADEMARK OFFICE
CERTIFICATE OF CORRECTION

PATENT NO.  :  4,676,513
DATED       :  6/30/87
INVENTOR(S) :  Del V. Tiegs and Randy G. Tiegs It is certified that error appears in the above-identified patent and that said Letters Patent is hereby corrected as shown below:

Claim 9, Column 4, Line 49, "connecting" should be --connector--.

Claim 9, Column 4, Line 57, "connecting" should be -- connector--.

Claim 9, Column 4, Line 61, after "on said" insert --conical--.

Claim 9, Column 4, Line 66, "connecting" should be --connector--.

Claim 9, Column 5, Line 4, "second" should be --first--.

Claim 11, Column 6, Line 9, "connecting" should be--connector--.

Signed and Sealed this

Thirtieth Day of August, 1988

Attest:

DONALD J. QUIGG

Attesting Officer          Commissioner of Patents and Trademarks

UNITED STATES PATENT AND TRADEMARK OFFICE
CERTIFICATE OF CORRECTION

PATENT NO.   :   4,676,513
DATED        :   6/30/87
INVENTOR(S)  :   Del V. Tiegs and Randy G. Tiegs It is certified that error appears in the above-identified patent and that said Letters Patent is hereby corrected as shown below:

Claim 9, Column 4, Line 49, "connecting" should be --connector--.

Claim 9, Column 4, Line 61, after "on said" insert --conical--.

Claim 9, Column 4, Line 66, "connecting" should be --connector--.

Claim 9, Column 5, Line 4, "second" should be --first--.

Claim 11, Column 6, Line 9, "connecting" should be --connector--.

This certificate supersedes Certificate of Correction issued August 30, 1988,

Signed and Sealed this

Twenty-seventh Day of September, 1988

Attest:

DONALD J. QUIGG

Attesting Officer        Commissioner of Patents and Trademarks